Sept. 4, 1956          G. A. LYON          2,761,408
METHOD OF MAKING SPOKED WHEEL COVER
Filed July 10, 1952.          2 Sheets-Sheet 1
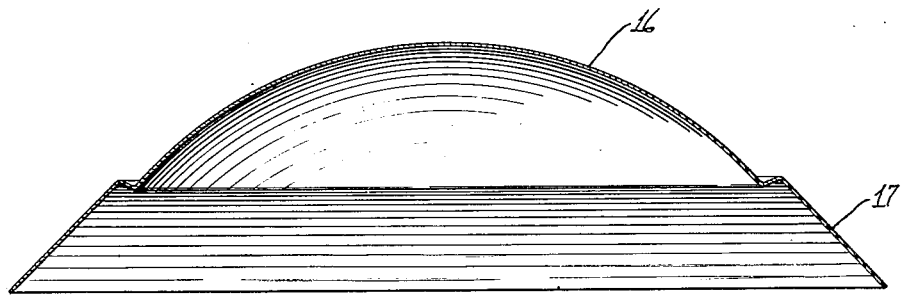
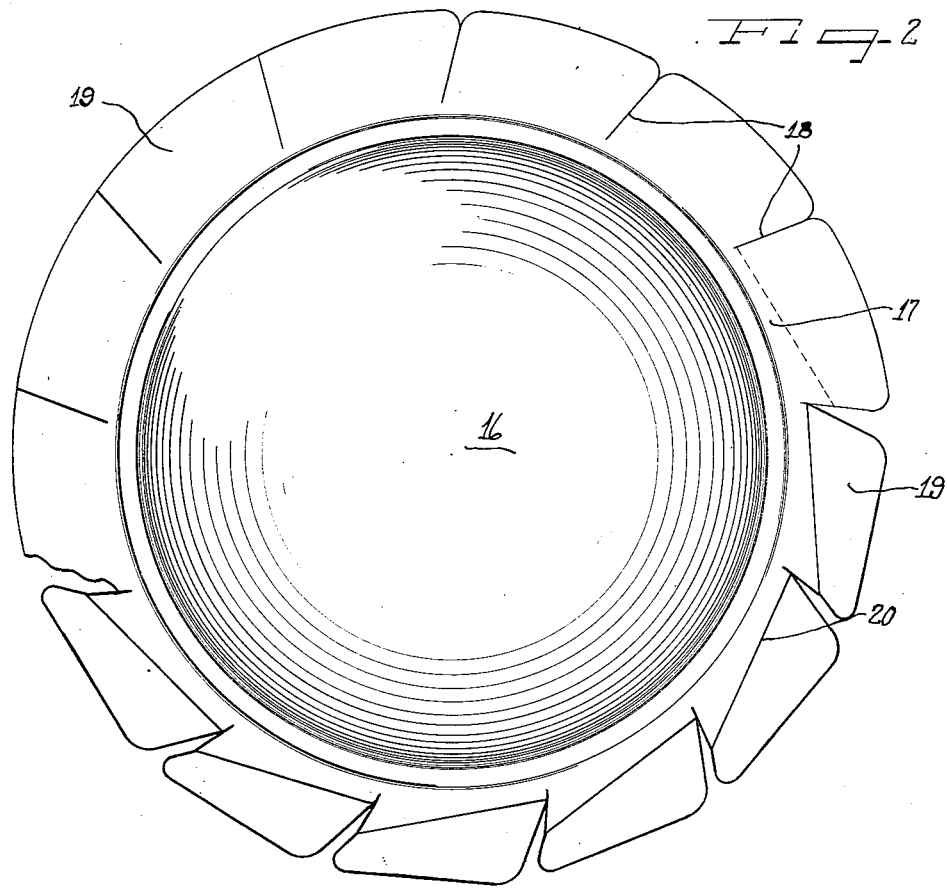
Inventor
George Albert Lyon
by Hill Sherman Meroni Gross & Simpson
Attys Sept. 4, 1956 G. A. LYON 2,761,408
METHOD OF MAKING SPOKED WHEEL COVER
Filed July 10, 1952 2 Sheets-Sheet 2
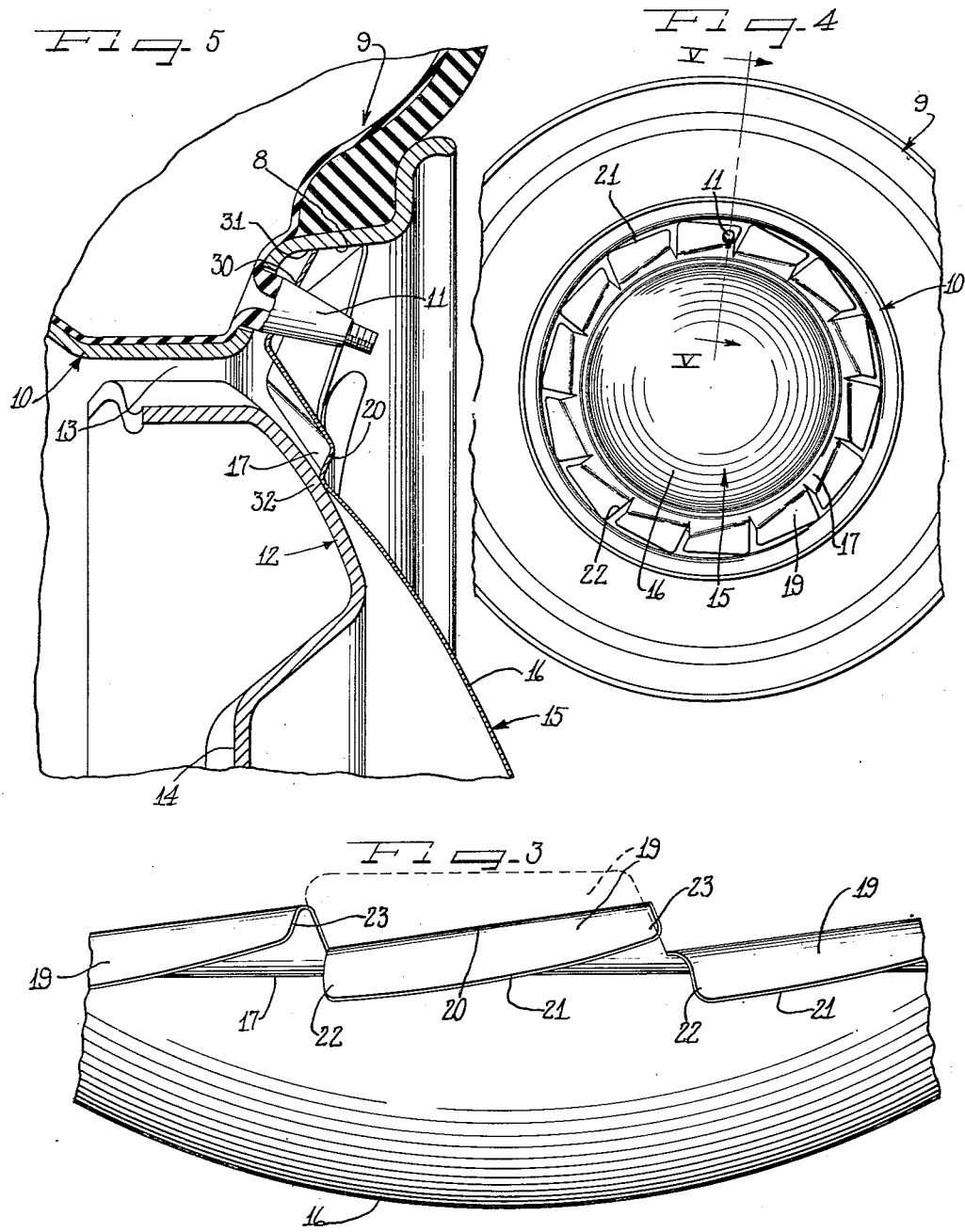
Inventor
George Albert Lyon
Hill Sherman Meroni Gross & Simpson
Attys United States Patent Office
2,761,408
Patented Sept. 4, 1956

2,761,408

METHOD OF MAKING SPOKED WHEEL COVER

George Albert Lyon, Detroit, Mich.

Application July 10, 1952, Serial No. 298,123

1 Claim. (Cl. 113—116)

This invention relates to automobile wheel covers and more particularly to a method of making a spoked wheel cover wherein the spokes serve as both cover retaining means and air circulating vanes.

An object of this invention is to provide a highly simple method of manufacturing a spoked wheel cover which lends itself to the economical manufacture of such covers on a large production basis.

Still another object of this invention relates to the provision of simplified steps for contemporaneously forming the margin of a circular blank into separated air scoops which, in addition to assisting in the circulation of the air through the wheel, also serve to retain the cover on the wheel.

In accordance with the general features of this invention there is provided in a method of making a wheel cover, the steps of blanking a circular dished shell having an annular margin, slitting the margin generally radially to divide it into a series of separated radial parts and bending and turning each of the separated radial parts of said margin along a line inclined with respect to the axis of the cover to position one end of each part axially outwardly of its other end.

Other objects and features of this invention will more fully appear from the following detailed description taken in connection with the accompanying drawings and in which:

Figure 1 is a cross-sectional view through a circular dished shell made in accordance with the initial step of my invention;

Figure 2 is a plan view of the shell shown in Figure 1 and illustrating successive steps of my novel method, whereby the peripheral margin of the shell is slit at spaced intervals and whereby the slit parts are bent and formed into spoke-like scoops;

Figure 3 is an enlarged fragmentary edge view looking at the lower part of Figure 2 and showing by dotted lines the position of one vane part prior to bending;

Figure 4 is a fragmentary side elevational view of a wheel showing my spoked cover applied thereto; and Figure 5 is an enlarged fragmentary cross-sectional view taken on substantially the line V—V of Figure 4 showing how the spoked outer portion of my cover cooperates with the wheel.

As shown on the drawings:

Since it is believed that my novel method will be best understood by first describing the article or wheel cover made by my method and its manner of cooperation with the wheel, I will first refer to Figures 3, 4 and 5.

The reference character 9 designates generally a conventional pneumatic tire and tube assembly mounted in the usual way upon a conventional multi-flange drop-center type of tire rim through which the usual valve stem 11 of the tire and tube assembly projects so as to be accessible from the exterior of the wheel.

In such a modern or conventional wheel, the tire rim 10 is carried upon a dished metallic central body part 12 fastened at spaced intervals to the base of the rim and leaving wheel openings 13 between the points of attachment. As is well known in the art, the circumferentially spaced wheel openings 13, which may be of any suitable number, assist in the circulation of air around the brake drum (not shown).

The wheel body part 12 has a central bolt-on flange 14 adapted to be secured by any suitable detachable means (not shown) to a part on the axle of the vehicle.

Cooperable with this wheel is a circular wheel cover designated generally by the reference character 15 and which embodies the features of this invention. It is designed to fit inside of the rim 10 and over the outer side of the wheel for covering up the irregularities in the contour of the wheel parts 10 and 12 as well as the central bolt-on flange. It is made of relatively thin sheet metal such, for example, as stainless steel strip stock and lends itself to a high lustrous finish for the purpose of ornamenting or decorating the wheel. Since my invention is particularly concerned with the forming and shaping of the outer peripheral margin of the cover 15, I shall now proceed with the description of how this portion is formed, referring particularly to Figures 1, 2 and 3.

Initially, a circular dished shell (Fig. 1) is blanked from strip stock providing a central crown portion 16 and a peripheral margin 17 of preferably generally frusto-conical shape sloping outwardly toward the axially inner side of the blank. I have used these same numbers 16 and 17 throughout the several figures for purposes of simplicity.

The peripheral margin 17 is then suitably slit at spaced intervals and such slits, which are designated by the reference character 18, extend generally in a radial direction but preferably angled slightly circumferentially with respect to the normal axis of the cover which coincides roughly with that of the wheel. This results in the provision of spaced radial parts 19 which correspond in number with the desired number of vanes or retaining fingers in the ultimate wheel cover.

Each part 19 is then bent generally axially outwardly along a line 20 extending transversely thereacross adjacent the base portion and inclined or tapered with respect to the axis of the cover, as best shown in Figs. 2 and 3. In addition, the free margin of the part 19 is contemporaneously turned along this line so that the edge 21 of each part projects in an outward direction or, in other words, in the same direction as the crown portion 16.

I have shown by dotted lines in Figure 3 the position from which one part 19 is turned during the bending and turning steps.

The foregoing steps result in the part 19 having a generally curved cross-section with one end portion 22 standing axially outwardly further than the trailing or other end portion 23. It will be noted from Fig. 3 that this results in the axially outer end 22 of each of the turned parts being spaced from the axially inner end 23 of the immediate adjoining part 19. It is this end 22 which serves as an air scoop.

Also, by reason of the inclination of the peripheral edge 21 of each part 19, such edge can bitingly grip an inclined flange 9 of the tire rim 10 when the cover is pressed into the wheel. In addition, at least one of the turned scoop-like parts 19 is provided with an opening 30 through which the valve stem 11 can project for accessibility on the exterior of the wheel cover (Fig. 5).

I have shown one of the parts 19 in biting engagement at 31 in Figure 5 with the rim flange 8.

Referring to Figure 4, it will be noted that the separated parts 19 are segmental in shape and that the scoop ends 22 are designed to scoop up air as the wheel turns in a counterclockwise direction. Thus, the air, as it is scooped up by each scoop or vane 19, travels between the trailing or axially inner end portion 23 of each scoop and the axially outer end portion 22 of the adjoining scoop.

In addition, it will be appreciated that the curved edges 21 of the spaced vane or scoop parts 19 are all arranged in a circular diameter slightly greater than the surface of rim flange 9 so that when the cover is pressed into the wheel, such parts 19 yield and apply a tensioned bite against the surface of rim flange 9.

In applying the cover to the wheel, the opening 30 is first aligned with the valve stem 11 and then the cover is pressed axially into the wheel until it bottoms at 32, Figure 5, against the wheel body part 12. In the course of this application of the cover, the spaced parts 19 resiliently yield as they are cammed along the surface of rim flange 9 and, thus, have a tensioned cover retaining engagement therewith.

In order to remove the cover, it is only necessary to insert the blunt end of an instrument, such as a screwdriver, between adjoining ends 22 and 23 of a given pair of spaced parts 19—19 and to apply a twisting pry-off force to the cover. In this manner the cover can be progressively dislodged from its gripping engagement with the rim flange 9.

It will also be perceived that the spaced parts 19 of the cover (Fig. 4) not only perform the functions of air-circulating vanes and cover retaining fingers, but in addition simulate spokes, thus giving the cover a highly ornamental appearance. In the rotation of the wheel, these spoke-like parts 19 assist in the circulation of air through the wheel openings 13 and thereby enhance the cooling of the brake drum (not shown).

The method subject matter of this application has been in part carved from my co-pending patent application, Serial No. 290,458, filed May 28, 1952, now abandoned, and, hence, this application is a continuation in part of my earlier filed application.

I claim as my invention:

In a method of making a spoke-like wheel cover in which the spokes serve as vanes and cover-retaining fingers, the steps of blanking a circular sheet metal body with a generally frusto-conical annular margin of substantial width, slitting said margin transversely thereacross at uniform circumferentially spaced intervals and running out at the margin edge to provide a series of spoke sections having connection with the body on a common annular line, and bending each of said sections along a respective line running obliquely from closely adjacent the inner end of the slit at one side thereof to a point intermediate the length of the slit at the opposite side thereof and turning the free or distal portion of the section along said line into oblique relation to the body-attached or proximal portion and to project divergently generally oppositely to the original direction of projection in the margin.

References Cited in the file of this patent

UNITED STATES PATENTS

| | | |
|---|---|---|
| 1,635,769 | Royle | July 12, 1927 |
| 1,668,462 | Oswand | May 1, 1928 |
| 2,023,111 | Alsing | Dec. 3, 1935 |
| 2,235,461 | Miller | Mar. 18, 1941 |
| 2,324,395 | Hoop | July 13, 1943 |
| 2,350,756 | Heinold | June 6, 1944 |

FOREIGN PATENTS

| | | |
|---|---|---|
| 787,597 | France | Sept. 25, 1935 |
| 786,227 | Australia | Oct. 27, 1937 |